US011673095B2

(12) United States Patent
Bishop et al.

(10) Patent No.: US 11,673,095 B2
(45) Date of Patent: Jun. 13, 2023

(54) HELICAL SEPARATION MEMBRANES AND TECHNOLOGIES UTILIZING THE SAME

(71) Applicant: CrossTek Membrane Technology, Holbrook, MA (US)

(72) Inventors: Bruce Bishop, Arlington, MA (US); Job Omweno, Woburn, MA (US)

(73) Assignee: CROSSTEK MEMBRANE TECHNOLOGY, Holbrook, MA (US)

(*) Notice: Subject to any disclaimer, the term of this patent is extended or adjusted under 35 U.S.C. 154(b) by 0 days.

(21) Appl. No.: 15/733,759

(22) PCT Filed: Apr. 17, 2019

(86) PCT No.: PCT/US2019/027848
§ 371 (c)(1),
(2) Date: Oct. 19, 2020

(87) PCT Pub. No.: WO2019/204420
PCT Pub. Date: Oct. 24, 2019

(65) Prior Publication Data
US 2021/0236993 A1 Aug. 5, 2021

Related U.S. Application Data

(60) Provisional application No. 62/659,817, filed on Apr. 19, 2018.

(51) Int. Cl.
*B01D 63/10* (2006.01)
(52) U.S. Cl.
CPC ........ *B01D 63/103* (2013.01); *B01D 2313/08* (2013.01); *B01D 2313/10* (2013.01); *B01D 2313/143* (2013.01)

(58) Field of Classification Search
CPC .......... B01D 2053/221; B01D 2313/08; B01D 2313/10; B01D 2313/14; B01D 2313/143;
(Continued)

(56) References Cited

U.S. PATENT DOCUMENTS 3,554,378 A * 1/1971 Kohl .................... B01D 63/024
  210/321.83
4,804,481 A * 2/1989 Lennartz ................ B01D 29/52
  210/791
(Continued)

FOREIGN PATENT DOCUMENTS

KR 1020150107346 9/2015

OTHER PUBLICATIONS

International Search Report and Written Opinion dated Aug. 5, 2019, issued in PCT Patent Application No. PCT/US2019/027848, 16 pages.
(Continued)

*Primary Examiner* — Pranav N Patel
(74) *Attorney, Agent, or Firm* — Grossman, Tucker, Perreault & Pfleger, PLLC

(57) ABSTRACT

Helical separation membranes, helical separation assemblies including one or more helical separation membranes, and separation technologies that include one or more helical membrane assemblies are described. In embodiments the helical membrane assemblies include one or more one or more helical membrane leaves. Methods of making helical separation membranes, helical membrane assemblies, helical membrane modules that include one or more helical membrane assemblies are also described.

11 Claims, 7 Drawing Sheets

(58) Field of Classification Search
CPC ...... B01D 63/00; B01D 63/103; B01D 69/12; B01D 29/48; B01D 46/403; B01D 63/10; C02F 1/44; C02F 2301/026
See application file for complete search history.

(56) References Cited

U.S. PATENT DOCUMENTS

| | | |
|---|---|---|
| 9,937,456 B2 | 4/2018 | Yoon |
| 2009/0095670 A1* | 4/2009 | Uda ................... B01D 63/106 210/232 |
| 2011/0036774 A1 | 2/2011 | McGinnis |
| 2011/0168623 A1 | 7/2011 | Uda et al. |
| 2011/0232061 A1* | 9/2011 | Jons ..................... B01D 67/00 29/426.2 |
| 2012/0261333 A1 | 10/2012 | Moran et al. |
| 2013/0146532 A1* | 6/2013 | Dontula .................. B29C 53/24 210/541 |
| 2015/0000520 A1 | 1/2015 | Liu et al. |
| 2016/0095969 A1* | 4/2016 | Maurer ............... A61M 1/1698 264/263 |
| 2017/0050149 A1* | 2/2017 | Jons ..................... B01D 65/08 |

OTHER PUBLICATIONS

Preliminary Report on Patentability dated Oct. 20, 2020, issued in PCT Patent Application No. PCT/US2019/027848, 9 pages.

* cited by examiner

103

| 901– Upper Membrane Sheet |
|---|
| 905 – Core Permeate Carrier |
| 903– Lower Membrane Sheet |

FIG. 9

HELICAL SEPARATION MEMBRANES AND TECHNOLOGIES UTILIZING THE SAME

CROSS-REFERENCE TO RELATED APPLICATIONS

This application is a national phase (§ 371) application of international (PCT) application no. PCT/US2019/027848, filed Apr. 17, 2019, which claims priority to U.S. provisional application No. 62/659,817, filed Apr. 19, 2018, the entire content of each of which is incorporated herein by reference.

FIELD

The present disclosure generally relates to helical separation membranes and technologies utilizing the same. In particular, the present disclosure relates to helical membrane sheets, helical membrane modules including one or more helical membrane leaves, productivity enhancing processes that can be used with helical membrane modules, and separation systems utilizing one or more such modules.

BACKGROUND

Modules including separation membranes are widely used in industrial, municipal, and governmental sectors for the treatment of water, wastewater (e.g., landfill leachate, sewage, runoff, etc.), non-aqueous fluids, and gases. Consequently the market value for membrane module technology is considerable, with some estimates indicating an annual market value exceeding one billion dollars.

A wide variety of separation module designs are presently used in many processes, including ultrafiltration, reverse osmosis (RO), forward osmosis (FO), pervaporation, membrane distillation, and gas separation applications. For example, a range of membrane module designs have been developed over the years for use in municipal and industrial fluid separations. Four examples of such module designs are the spiral wound module, the plate and frame module, the tubular module, and the hollow fiber module.

Plate and frame modules generally utilize supported multilayer flat sheet separation membrane leaves that are stacked on top of one another. In operation, feed is pumped between the separation membrane leaves in the module. At least a portion of the feed penetrates one or more of the flat sheet separation membrane leaves and is extracted from the edge thereof as permeate. In contrast, spiral wound modules often include a central permeable tube around which one or more leaves of separation membrane is/are wound, such that the separation membrane leaves are disposed axially around the permeable tube when observed from the perspective of an end of the module. Feed spacers may be disposed between adjacent leaves of separation membrane. When used, feed may be pumped axially through the feed spacers. At least a portion of the feed penetrates the sheets of separation membrane that make up the leaves and is conveyed to the permeable tube, where it may be extracted as permeate.

Tubular membrane modules often utilize polymeric or ceramic tubular separation membranes that are in the form of a macro porous tubular support with micro porous membrane layers applied on the inside surfaces of the support. One or more of such assemblies can be sealed into a housing to create the module. Hollow fiber membrane modules are like tubular membrane modules in that the effective shape of the separation membrane is a tube. However, hollow fiber membrane modules utilize tubes that are considerably smaller in diameter than those that are utilized in tubular membrane modules. Consequently, hollow fiber membrane modules may have considerably more membrane surface area than tubular membrane modules, but at the potential expense of increased pressure drop and reduced ability to handle suspended solids (again compared to tubular membrane modules).

Although the above described membrane module designs are useful and have been adopted to varying degrees in industry, they have different performance characteristics and price points, and may not be suitable for all applications. For example, plate and frame modules may allow for treatment of viscous and/or high solids feeds but are not as compact as other module types. Feed spacers in spiral wound modules are susceptible to clogging and bio-fouling and can be difficult to clean. Tubular separation modules may require significant amounts of energy to operate. Hollow fiber module may provide relatively large amounts of membrane area, but at the cost of high pressure drop and relatively low ability to handle suspended solids. Such modules may also require recirculation pumping when operated in a crossflow configuration, which can increase operating energy cost to maintain reasonably high product recovery. Thus, an interest remains in the development of novel membrane filtration technologies that provide desirable performance characteristics.

BRIEF DESCRIPTION OF THE DRAWINGS

The features of this disclosure and the manner of attaining them will become more apparent and better understood by reference to the following description of embodiments described herein taken in conjunction with the accompanying drawings, in which like numbers denote like components, and wherein:

FIG. 9 depicts one example of a helical membrane leaf that includes a core permeate carrier between upper and lower membrane sheets.

DETAILED DESCRIPTION

As noted in the background various membrane separation module designs have been adopted to varying degrees in industry. However existing module designs are not without challenges, and often present economic and performance tradeoffs that can limit their usefulness and/or practical implementation. With that in mind, the present disclosure generally relates to separation technologies that include one or more helical membrane assemblies. In embodiments the separation technologies described herein include helical membrane assemblies that include one or more one or more helical membrane leaves, and helical membrane modules that include one or more helical membrane assemblies. Another aspect of the present disclosure relates to methods of making helical membrane assemblies and methods of making helical membrane modules that include one or more helical membrane assemblies. And yet another aspect of the present disclosure relates to systems and processes that utilize one or more helical membrane modules.

The terms "helix" and "helical" are used interchangeably herein in connection with a separation membrane to refer to a separation membrane that is arranged in a helical or spiral fashion around an axis. For convenience and ease of understanding, embodiments of the present disclosure are described as including a helical membrane in the form of one or more symmetrical or substantially symmetrical leaves that are disposed in a helicoid around an axis. Such membranes may be referred to herein as a "helical membrane." Such description is for the sake of example only, and that the use of a symmetrical or substantially symmetrical helical membrane (e.g. a helicoidal membrane) is not required. Indeed, the present disclosure envisions and encompasses helical membrane assemblies, modules, and systems that include one or more helical membrane assemblies in which one or more helical membranes is/are disposed in any helical or spiral fashion around an axis, including asymmetric and symmetric helical configurations.

Figure 1:
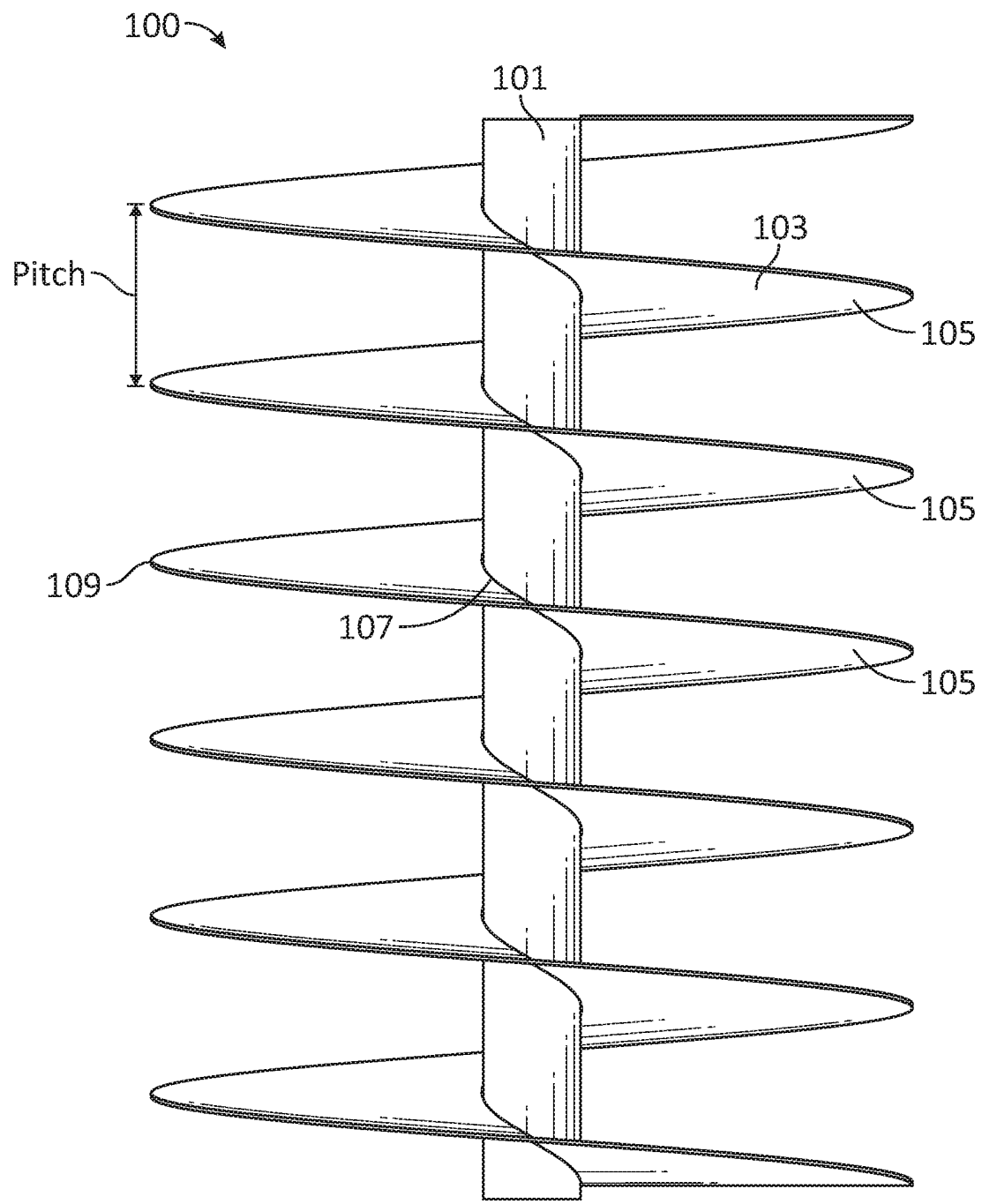
FIG. 1 is a side view of one example of a helical membrane assembly including a helical membrane leaf consistent with embodiments of the present disclosure.

FIG. 1 depicts one aspect of a helical membrane assembly consistent with the present disclosure. As shown, helical membrane assembly 100 includes a permeate cavity 101 and a helical membrane leaf 103. In the embodiment of FIG. 1 and in various other FIGS., permeate cavity 101 is shown in the form of a tube, but such configuration is for the sake of example only and permeate cavity 101 may have any suitable geometry. As shown, helical membrane leaf 103 is wound around the permeate cavity 101 such that it includes a plurality of flights 105 which are collectively disposed in a spiral (e.g., helical or helicoidal) configuration around permeate cavity 101. The permeate cavity 101 may therefore be understood as defining or surrounding an axis (not shown) around which helical membrane leaf 103 is disposed.

In embodiments the helical membrane leaf 103 includes a core permeate chamber that is sandwiched between two or more membrane sheets, such as an upper membrane sheet and a lower membrane sheet. That concept is shown in FIG. 9, which depicts one embodiment of a helical membrane leaf 103 that includes an upper membrane sheet 901, a lower membrane sheet 903, and a core permeate carrier 905, wherein the core permeate carrier is sandwiched between the upper and lower membrane sheets 901, 903. The membrane sheets can be of any suitable type of separation membrane. For example such sheets may be formed from or include materials that are suitable for use in the filtration of a feed flow (e.g., polymeric, ceramic, and/or metallic materials and combinations thereof) as understood in the art.

In embodiments one or more of the membrane sheets is a symmetric or asymmetric membrane sheet. Symmetric membrane sheets are those in which the nominal pore size is uniform or substantially uniform through the thickness of the sheet. Asymmetric membrane sheets are those that have nominally finer pores on one face than on the opposing face of the sheet. The asymmetric structure can be constructed in numerous ways (as understood in the art) to reduce hydraulic resistance across the membrane while presenting very fine pores to the feed to reject very small materials, whether suspended or dissolved. The membrane layers may be configured, for example, to filter a feed via microfiltration, ultrafiltration, nanofiltration, reverse osmosis, forward osmosis, pervaporation, gas separation, and other liquid-liquid, solid-liquid, liquid-gas, and gas-gas separation processes, or any other suitable filtration technique. Non-limiting examples of suitable separation membranes that may be used include titanium microfiltration, titanium dioxide ultrafiltration, polyvinylidene fluoride (PVDF) ultrafiltration, cellulose acetate nanofiltration, polyamide reverse osmosis, zeolitic pervaporation, and polyimide and polymethylsiloxane gas separation membranes.

In embodiments the permeate chamber within the helical membrane leaf is filled with a permeable material (core permeate carrier) that supports both membrane sheets and allows permeate to travel to permeate cavity 101, from which the permeate is carried away from the membrane module. The permeate chamber can be formed with discrete permeate supports that perform the same function as the permeate carrier but do not fill the permeate chamber, thereby allowing for a lower resistance to permeate flow from the permeate chamber to the permeate cavity. In the case of FIG. 1 the permeate cavity is within the permeate cavity 101. Any suitable materials may be used to form the core permeate carrier or the permeate supports. For example, in some embodiments helical membrane leaf 103 includes a core permeate carrier formed from knitted polyester tricot or simplex fabrics.

In embodiments the helical membrane leaf 103 is configured to allow for the development of secondary flows in the feed fluid and potentially even the permeate fluid. Such secondary flows may include (but are not limited to) Dean vortices, which may enhance mass transfer at the surface(s) of the helical separation membrane. The secondary flows may enhance permeate flux through the helical separation membrane, which may provide a distinct advantage over separation membrane configurations that operate with other feed flow regimes (e.g., laminar flow, turbulent flow, Taylor flow, etc.).

Each of the flights 105 of the helical membrane leaf 103 has an inner edge 107 and an outer edge 109. In embodiments each flight 105 is coupled to the permeate cavity 101 at a region proximate to the inner edge 107. Coupling of the flights 105 to the permeate cavity 101 may be accomplished in any suitable manner. For example, the helical membrane leaf 103 and each of its flights 105 may be coupled to the permeate cavity 101 via mechanical fasteners, an adhesive, chemical bonding, a weld, an interference fit joint, other fastening means, combinations thereof, and the like.

In embodiments the permeate cavity 101 includes one or a plurality of openings through which the inner edge 107 of each of the flights 105 is disposed. For example the permeate cavity 101 may include one or more spiral openings that span through the outer wall thereof, such that the permeate cavity 101 has a spring like configuration. The spiral opening(s) may be configured to receive the inner edge 107 of each of the flights 105 there through, such that at least a portion of a permeate carrier of the helical membrane leaf 103 (e.g., a core permeate carrier) is in fluid communication with the permeate cavity within the permeate cavity 101. The flights 105 in such embodiments may be coupled to the permeate cavity 101 in any suitable manner as noted above.

In embodiments the inner edge 107 or a portion of each of the flights 105 radially inward of the inner edge 107 is coupled to permeate cavity 101 via an adhesive, a weld, a mechanical fastener, combinations thereof and the like.

The outer edge 109 of each of the flights 105 may be sealed to facilitate conveyance of permeate within the permeate carrier of the helical membrane leaf 103 to permeate cavity 101. Sealing of the outer edge 109 may be accomplished in any suitable manner. For example, the outer edge 109 may be sealed via welding (e.g., laser or ultrasonic welding), via an adhesive, compression bonding/sealing, other sealing means, combinations thereof, and the like. Without limitation, in embodiments the outer edge 109 is sealed via ultrasonic welding.

In the embodiment of FIG. 1 the helical membrane leaf 103 is wound around permeate cavity 101 in a helicoid such that adjacent flights 105 have a defined spacing between their center points along the outer edges thereof. Such spacing is hereinafter referred to as "membrane pitch" or simply, "pitch." Any suitable membrane pitch may be used, and the membrane pitch may be adjusted to attain desired operational characteristics, such as a desired pressure drop, desired membrane path length, combinations thereof, and the like. For example, pressure drop across the separation assembly may be increased or decreased by decreasing or increasing membrane pitch, respectively. Similarly, membrane path length of the helical separation membrane 103 may be increased or decreased by decreasing or increasing the membrane pitch, respectively.

While FIG. 1 depicts helical membrane leaf 103 with a uniform membrane pitch, such a configuration is not required. Indeed the present disclosure envisions and encompasses embodiments in which the pitch of helical membrane leaf 103 may vary. For example, helical membrane leaf 103 may be configured such that it has a first pitch proximate a first end of helical membrane assembly 100 (e.g., an inlet end) and a second pitch proximate a second end of helical membrane assembly 100 (e.g., an outlet end), wherein the first pitch differs from the second pitch. In embodiments the first membrane pitch is larger than the second membrane pitch, or vice versa. In those or other embodiments, the pitch may vary in a gradient (increasing or decreasing) from the first membrane pitch (between adjacent flights proximate an inlet end of helical membrane assembly 100) to the second membrane pitch (between adjacent flights proximate a second (outlet) end of helical membrane assembly 100).

The actual value of the membrane pitch may vary widely and may be set based on the desired operating characteristics for the helical membrane assembly and/or a module including the assembly. In embodiments the pitch may range from greater than 0 to 2.5 centimeters (cm) or more, such as from greater than 0 to about 1.25 cm, from greater than 0 to about 0.75 cm, from greater than 0 to about 5 millimeters (mm), from greater than 0 to about 2.5 mm, from greater than 0 to about 1000 microns (μm), from greater than 0 to about 800 μm, from greater than 0 to about 500 μm, or even from greater than 0 to about 250 μm, including any ranges defined by values within the foregoing ranges.

Helical membrane leaf 103 and the flights 105 thereof may be configured as a self-supporting structure, as shown in FIG. 1. In such embodiments the membrane pitch between adjacent flights 105 may be maintained without the use of a support, such as a feed spacer. Alternatively or additionally, one or more supports (e.g., feed spacers) may be provided between adjacent flights 105 of the helical membrane leaf 103, e.g., to facilitate and maintain the membrane pitch between adjacent flights.

Figure 2A:
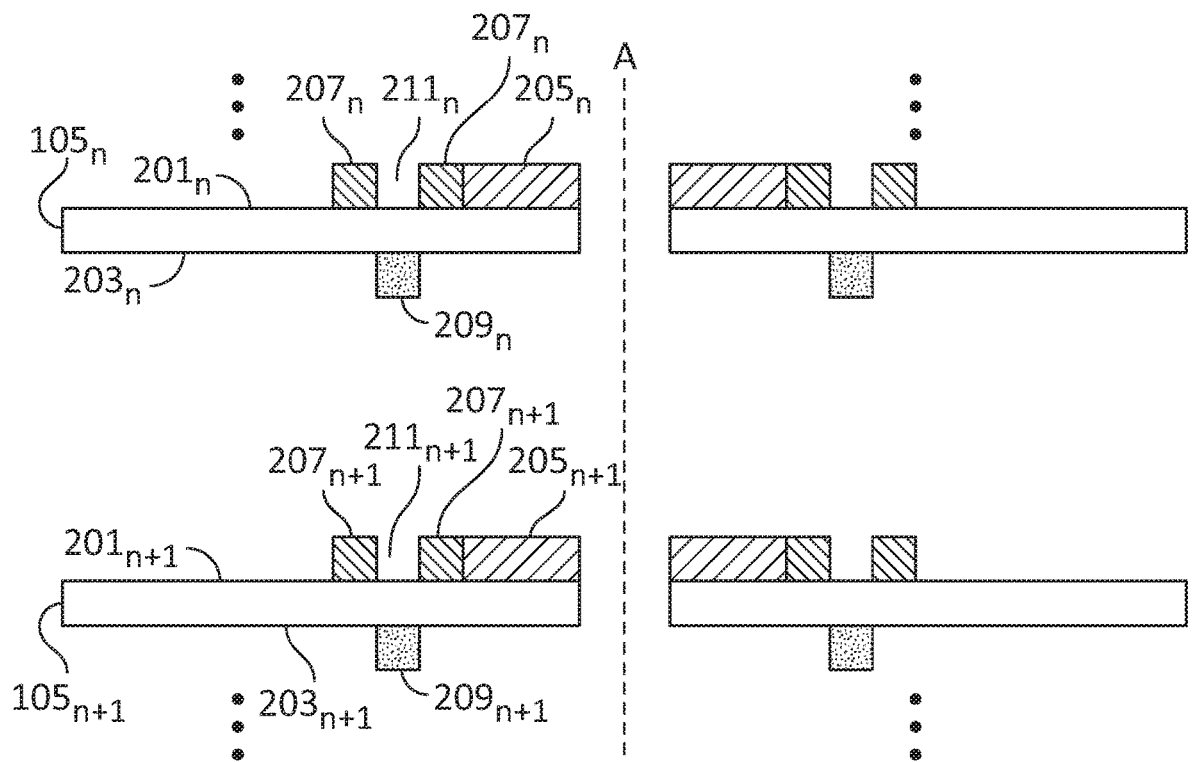
FIGS. 2A and 2B are magnified views of adjacent flights of a non-limiting example of a helical membrane leaf consistent with embodiments of the present disclosure, in an unassembled and assembled configuration, respectively.
Figure 2B:
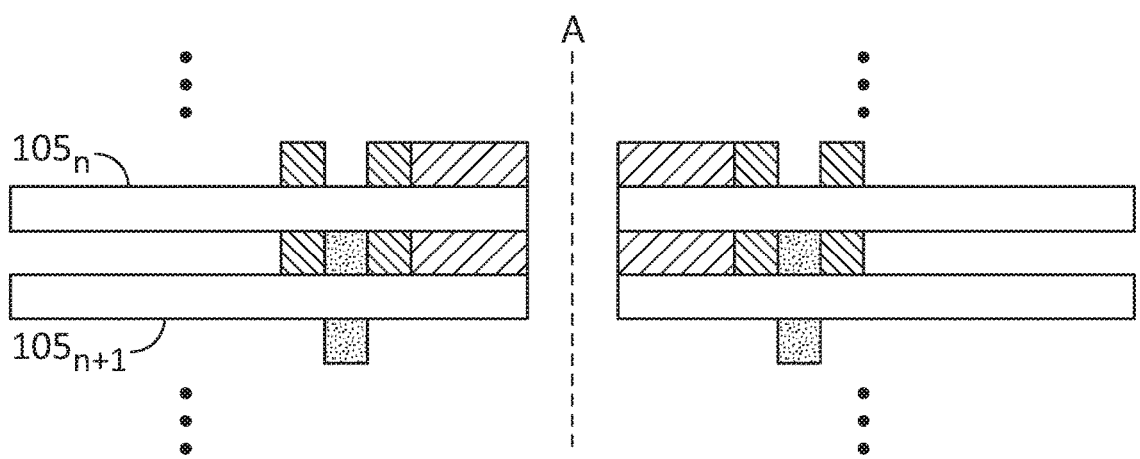

FIGS. 2A and 2B are magnified views of adjacent flights of one non-limiting example of a helical membrane consistent with embodiments of the present disclosure, in an unassembled (FIG. 2A) and assembled (FIG. 2B) configuration. In the embodiment illustrated in such figures, helical membrane leaf 103 includes adjacent flights $105_n$ and $105_{n+1}$, where n is an integer greater than 0. Each of the adjacent flights $105_n$, $105_{n+1}$ has a first surface $201_n$, $201_{n+1}$ and an opposing second surface $203_n$, $203_{n+1}$. In the illustrated embodiment the first surfaces $201_n$, $201_{n+1}$ are depicted as upper surfaces and the second surfaces $203_n$, $203_{n+1}$ are depicted as lower surfaces, but such an arrangement is not required and could be reversed. Moreover, each of the flights $105_n$, $105_{n+1}$ includes an opening that is disposed around an axis A (e.g., defined by or extending through a permeate cavity).

Optional reinforcements $205_n$, $205_{n+1}$ may be present on the first surface $201_n$, $201_{n+1}$ of each of the flights $105_n$, $105_{n+1}$. When used, the optional reinforcements $205_n$, $205_{n+1}$ may be configured to reinforce a portion of its respective flight $105_n$, $105_{n+1}$. Alternatively or additionally, in embodiments the reinforcements $205_n$, $205_{n+1}$ may be configured to form a portion of the permeate cavity 101 during the construction of helical membrane assembly 100. For example, the permeate cavity 101 may be formed in situ by reinforcements $205_n$, $205_{n+1}$ during the production of the helical membrane assembly 100.

More specifically, reinforcements $205_n$, $205_{n+1}$ may be formed on the first surface of flights $105_n$, $105_{n+1}$, either before or after the formation of a helical membrane leaf 103. The reinforcements $205_n$, $205_{n+1}$ may then be joined to one another in any suitable manner. For example, in embodiments the reinforcements $205_n$, $205_{n+1}$ may be or include a fibrous material (e.g., organic or inorganic fibers). After sections of helical membrane leaf 103 are joined (e.g., spliced) to one another, the reinforcements $205_n$, $205_{n+1}$ may be impregnated with a resin material. Alternatively, reinforcements $205_n$, $205_{n+1}$ can be attached to the pre-formed helical membrane leaf that subsequently can be impregnated with a resin material. The resin material may thereafter be cured to form a fiber reinforced composite (i.e., a sidewall of permeate cavity 101) with the inner edge 107 of each of the flights $105_n$, $105_{n+1}$ disposed within a permeate cavity defined by the fiber reinforced composite (i.e., permeate cavity).

Examples of resin materials that can be used to impregnate the reinforcements $205_n$, $205_{n+1}$ include urethanes, epoxies, and silicones. The resin materials may also be filled with or contain particles or fibers to enhance the resin rheology and/or the mechanical properties of the resin post-curing. In embodiments the resin can be cured e.g., photochemically, with a curing or hardening agent, and/or a combination thereof. For example, in embodiments the resin is curable by the application ultraviolet or other light.

A modification of the above in-situ formed permeate cavity using reinforcements $205_n$, $205_{n+1}$ is to modify each flight of the helical membrane leaf 103 to allow structural connection across the inner edge of each flight from one section of the resin-impregnated reinforcement to the adjacent one. In this non-limiting example, notches are cut out of the inner edge of the helical membrane leaf 103 so that regions of reinforcements $205_n$, $205_{n+1}$ can be near or in direct contact with each other without the helical membrane leaf 103 between the reinforcements $205_n$, $205_{n+1}$ in the notched regions. Resin impregnation of the reinforcements $205_n$, $205_{n+1}$ also results in the connection of the sides of the reinforcements $205_n$, $205_{n+1}$ in the notched areas by resin. As the notched areas do not extend past the inner feed spacer elements $207_n$, $207_{n+1}$ the resin does not penetrate or extend onto the surface of the helical membrane leaf 103. Rather, the resin only mechanically connects the reinforcements $205_n$, $205_{n+1}$ in the notched regions. It is noted that in embodiments in which reinforcements $205_n$, $205_{n+1}$ are not used, in-situ formation of a resin-based permeate cavity is still possible via filling of the gap between adjacent flights $105_n$, $105_{n+1}$ of the helical membrane leaf 103 with resin material followed by curing to create a solid permeate cavity.

Regardless of whether reinforcements $205_n$, $205_{n+1}$ are used, feed spacer elements may be provided on one or more surfaces of flights $105_n$, $105_{n+1}$, e.g., to define and or maintain the membrane pitch between such flights. That concept is illustrated in the embodiments of FIGS. 2A and 2B, which depict the use of first spacer elements $207_n$, $207_{n+1}$ and second spacer elements $209_n$, $209_{n+1}$ on first and second surfaces (respectively) of adjacent flights $205_n$, $205_{n+1}$.

As shown in FIG. 2A, during assembly of a helical membrane assembly 100 separate membrane surfaces corresponding to flights $105_n$, $105_{n+1}$ may be provided. A plurality of first feed spacer elements $207_n$, $207_{n+1}$ may be provided on corresponding first surfaces $201_n$, $201_{n+1}$, and at least one second feed spacer element $209_n$, $209_{n+1}$ may be provided on corresponding second surfaces $203_n$, $203_{n+1}$. For the sake of illustration FIGS. 2A and 2B depict an embodiment in which two first spacer elements and one second spacer element is used for each of leaves $205_n$, $205_{n+1}$, but any number of first and second spacer elements may be used The feed spacer elements may be formed on the membrane leaves $105_n$, $105_{n+1}$ in any suitable manner. For example, the spacer elements may be formed on the membrane leaves $105_n$, $105_{n+1}$ via additive manufacturing (e.g., three-dimensional (3D) printing), polymeric vapor deposition, thick film deposition, direct polymer melt deposition, electro spinning, combinations thereof, and the like. Without limitation, in embodiments the spacer elements are formed on the membrane leaves $105_n$, $105_{n+1}$ by additive manufacturing using resin materials the same as or similar to those noted above for forming the in-situ permeate cavity/reinforcement elements.

In the illustrated embodiment the first spacer elements $207_n$, $207_{n+1}$ are positioned to define a gap $211_n$, $211_{n+1}$ on the first surfaces $201_n$, $201_{n+1}$ of adjacent flights $105_n$, $105_{n+1}$. The gap $211_n$, $211_{n+1}$ may be configured such that a second spacer element $209_n$, $209_{n+1}$ of an adjacent flight can be received therein, e.g. when the flights are brought together into an assembled state to define a helical membrane assembly. That concept is best shown in FIG. 2B, which depict second spacer element $209_n$ disposed within gap $211_{n+1}$.

The membrane pitch and other orientation parameters of the helical membrane assembly described herein may be controlled through appropriate adjustment of the configuration of the first spacer elements $207_n$, $207_{n+1}$ and/or second spacer elements $209_n$, $209_{n+1}$. For example by controlling the height of such spacer elements, the membrane pitch of adjacent leaves may be controlled. Similarly, the membrane pitch may be controlled by adjusting the relative placement of the first and second spacer elements relative to the inner and/or outer edge of each membrane leaf.

While FIGS. 2A and 2B depict the use of a limited number of first and second feed spacer elements that are disposed proximate to an inner edge of a helical membrane leaf (i.e., proximate to a permeate cavity in a helical membrane assembly), such a configuration is not required. Indeed it should be understood that the number, configuration, and placement of spacer elements may be configured in any suitable manner, so as to attain a helical separation membrane having a desired physical configuration and/or desired performance characteristics. For example, in some embodiments one or more spacer elements may be placed proximate to an outer edge of a helical membrane leaf, e.g., proximate the outer edge of all or a subset of the membrane flights thereof.

As described above a helical membrane leaf 103 consistent with the present disclosure may be constructed by joining (e.g., splicing) multiple sections of a membrane leaf to one another along a slit edge. For example, manufacture of a helical membrane leaf 103 may begin with the provision of discrete sheets of a separation membrane and a permeate carrier, wherein the discrete sheets have a single outer edge. Such sheets may be circular, substantially circular, oval, elliptical, or the like. Construction of a helical separation membrane may then proceed by forming an opening through each discrete sheet of separation membrane and permeate carrier at a location coinciding with an axis around which the helical separation membrane is to be wound. A permeate carrier sheet can be sandwiched between two membrane sheets and the outer edge can be sealed in various ways, such as ultrasonic bonding. Concurrently or subsequently, a slit extending from the outer edge of each section of membrane leaf may be cut or otherwise formed, resulting in the production of slit leaf sections that include a first slit edge and a second slit edge.

The method may then continue by splicing or otherwise coupling one (e.g., a first) slit edge of a first slit leaf section to another (e.g., second) slit edge of a second slit leaf section. Splicing of the slit ends of different slit leaf sections may be performed in any suitable manner, such as with an adhesive, a tape, a mechanical fastener, chemical or other bonding, welding (e.g. ultrasonic and/or laser welding) combinations thereof, and the like. Without limitation, in embodiments a helical membrane leaf is formed by splicing slit ends of two or more slit sheets by spanning a joint between the leaf sections on both sides with at least one strip of membrane sheet, and joining the stripes of membrane sheet to the leaf sections, e.g., by ultrasonic bonding or another suitable technique.

The resulting spliced structure may be arranged in a spiral (e.g., helicoid) by displacing the unspliced edges of the outermost leaf sections away from one another. For example, when first and second slit sections are spliced to one another along respective slit edges, a helical configuration may be produced by displacing the unspliced edge of the first slit section away from the unspliced edge of the second slit section. To produce a longer helical membrane leaf 103, one or more additional slit leaf sections may be spliced to the unspliced slit end(s) of the first and/or second leaf sections, e.g., in the manner discussed above. The process may continue until a helical membrane leaf of a desired length is obtained. In that way, a helical membrane leaf of any desired path length may be obtained. In embodiments, the helical membrane leaves described herein may have a path length ranging from greater than 0 to about 1000 feet or more, such as from about 50 to about 500 feet, or even about 100 to about 250 feet.

The helical membrane leaves described herein may be coupled to a permeate cavity in any suitable manner to form a helical membrane assembly. For example and as explained briefly above, a permeate cavity that includes one or more openings may be provided. The opening(s) may be extend through the wall of the permeate cavity, and may be configured to receive an inner edge of a helical membrane leaf therein. How the inner edge of the helical separation membrane is disposed within the opening may vary, and may differ depending on how the separation assembly is constructed.

In some embodiments a helical membrane assembly may be formed using a plurality of slit leaf sections. The inner edge of a first slit leaf section (i.e., the edge along the opening in the first leaf section) may be inserted fully or partially through a corresponding opening within a permeate cavity, after which the first slit leaf section may be bonded or otherwise coupled to the permeate cavity. The inner edge of a second slit leaf section may then be fully or partially inserted in the same or different opening in the permeate cavity, such that a slit edge of the second slit leaf section is aligned with a slit edge of the first slit leaf section. The aligned slit edges of the first and second leaf sections may then be spliced to one another, and the second leaf section may be bonded or otherwise coupled to the permeate cavity. Construction may continue in that fashion until a helical membrane assembly 100 with a desired length of helical membrane leaf 103 is obtained.

Alternatively in some embodiments a helical membrane assembly 100 may be produced by pre-constructing a helical membrane leaf 103 in the manner described above (i.e., by splicing slit edges of several different membrane leaf sections, independent of a permeate cavity. Before or after the formation of the helical membrane leaf, reinforcements (e.g., reinforcement $205_n$, $205_{n+1}$) and/or feed spacer elements ($207_n$, $207_{n+1}$ and/or $209_n$, $209_{n+1}$) may be formed or otherwise disposed on a first surface ($201_n$, $201_{n+1}$) and/or a second surface ($203_n$, $203_{n+1}$) of each membrane leaf section or helical membrane leaf 103. The helical membrane leaf 103 may then be fully or partially collapsed along the axis extending through the opening of each flight, such that each flight of the helical membrane leaf 103 is adjacent to (e.g., in contact with) a reinforcement and/or a spacer element on an adjacent flight, as best shown in FIG. 2B. The reinforcements or selected gaps between adjacent flights may then be impregnated or filled with a resin or other curable liquid (e.g., a urethane or epoxy resin), as discussed above.

Alternatively or additionally, following the provision of reinforcements $205_n$, $205_{n+1}$ and/or feed spacer elements $207_n$, $207_{n+1}$ and/or $209_n$, $209_n$+1 on the adjacent flights, the helical membrane leaf 103 may be oriented to facilitate the introduction of a resin or other curable liquid between the adjacent flights $105_n$, $105_{n+1}$. For example, in embodiments the helical membrane leaf 103 may be oriented horizontally and held together under compression. A resin or other curable liquid may then be applied to impregnate in and around the reinforcements $205_n$, $205_{n+1}$ and/or in the gaps between the flights. To facilitate impregnation of the reinforcements, the assembly 100 under compression can be spun about an axis extending through the opening thereof. As the helical membrane assembly 100 is spun, a tool that follows the helical pattern of the helical membrane leaf may be used to inject a resin or other curable liquid into the reinforcements $205_n$, $205_{n+1}$ or into the gap between the flights next to the inner edge of the leaf.

In any case, the resin or other curable liquid may penetrate into and around the reinforcement or into the gap, after which it may be cured to form a permeate cavity defining a permeate cavity. The impregnation/filling and curing of the resin or other curable liquid may be controlled such that the inner edge of each membrane leaf remains in fluid communication with the permeate cavity of the permeate cavity. For example, the hole through the helical membrane assembly 100 can be honed or trimmed to remove any of the inner edge of the helical membrane leaf 103 that has been covered with resin to expose the permeate carrier so that permeate flow from the carrier is in communication with the permeate cavity.

Figure 3:
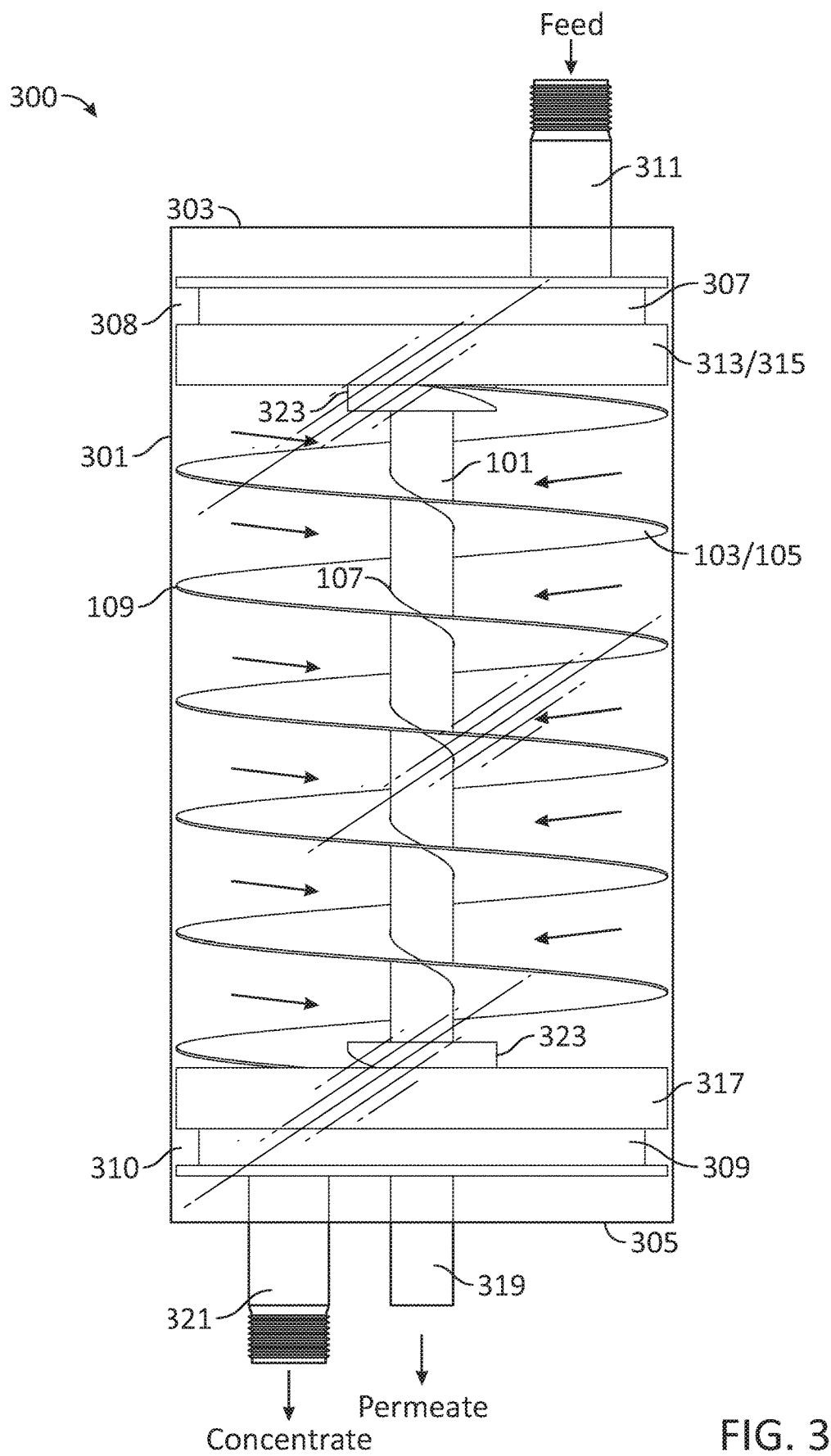
FIG. 3 is a side view of one example of a helical membrane module consistent with embodiments of the present disclosure.

Another aspect of the present disclosure relates to helical membrane modules that include the helical membrane assembly 100 consistent with the present disclosure. Reference is therefore made to FIG. 3, which is a side view of one example of a helical membrane module consistent with embodiments of the present disclosure. As shown, helical membrane module 300 includes a housing 301 having a first end 303 and a second end 305. A first sealing flange 307 is disposed proximate the first end 303, and a second sealing flange 309 is disposed proximate the second end 305. In this embodiment, first and second seals 308, 310 (e.g., O-ring seals) are utilized to form a seal between first and second sealing flanges 307, 309 and a portion of the inner surface of housing 301.

Helical membrane module 300 further includes a feed pipe 311. Feed pipe 311 is configured to receive a flow of a feed from a feed source (e.g., a pump), as generally shown in FIG. 3 by an arrow labeled "FEED." In embodiments and as best shown in FIG. 7, first sealing flange 307 includes a feed opening 701 that is configured to receive or couple to an end of feed pipe 311.

Figure 7:
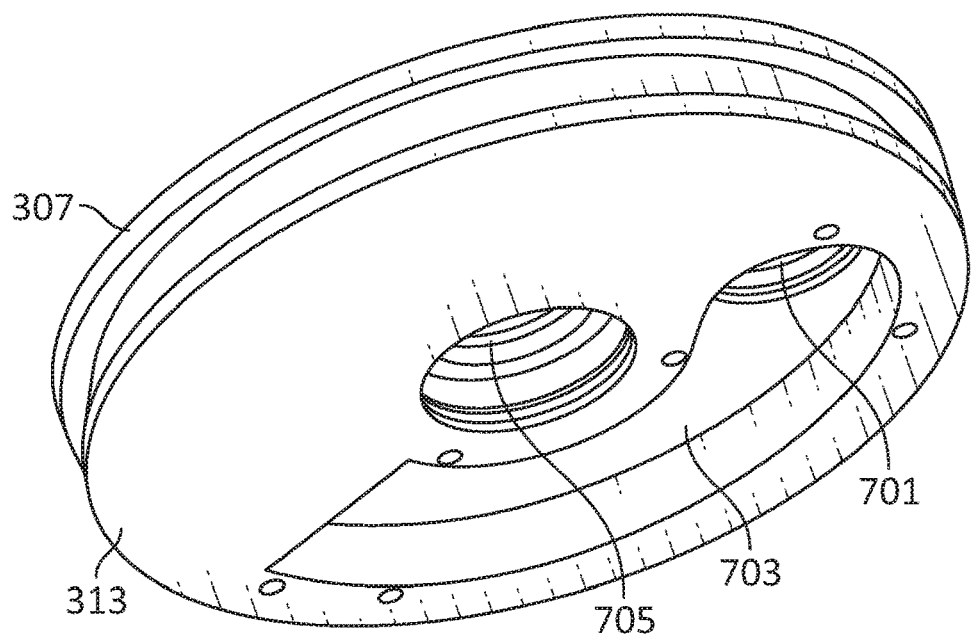
FIG. 7 is a perspective view of one example of an inlet connector consistent with the present disclosure.

In embodiments and as further shown in FIGS. 3 and 7, helical membrane module 300 further includes an inlet connector 313 that is disposed inward of the first sealing flange 307. As best shown in FIG. 7, the inlet connector 313 may be integral with the first sealing flange 307, but such a configuration is not required. In embodiments the inlet connector 313 and first sealing flange 307 are separate components, which may be separate from or coupled to one another in any suitable fashion.

In the embodiment of FIG. 7, inlet connector 313 is integral with first sealing flange 307 and includes a recess 703. Recess 703 is generally configured to receive (house) a feed flow transition 315. The feed opening 701 is in fluid communication with recess 703, and is located such that a feed flow provided through the feed opening 701 (or an end of feed pipe 311 extended there through) is conveyed to a receiver of the feed flow transition 315.

As noted above the helical membrane module 300 may further include a feed flow transition 315, the details of which will be described later. In general, the feed flow transition 315 is configured to receive a feed flow from feed opening 701 and/or feed pipe 311 and convey that feed flow to a helical membrane assembly 100 consistent with the present disclosure. More particularly, the feed flow transition 315 may be configured to introduce the feed flow between adjacent flights (e.g. uppermost adjacent flights) of a helical membrane leaf included in a helical membrane assembly consistent with the present disclosure.

Returning to FIG. 3, the helical membrane module 300 further includes a helical membrane assembly 100 consistent with the present disclosure. The elements of the helical membrane assembly 100 and their corresponding functions are described above in connection with FIGS. 1 and 2, and so are not reiterated in the interest of brevity. As shown in FIG. 3, the helical membrane assembly 100 is generally disposed between the inlet connector 313 and an outlet connector 317. In that regard and with reference to FIG. 7, the inlet connector 313 may include a first orifice 705 that is configured to receive and/or couple to an end of the permeate cavity 101. In the embodiment of FIG. 7, the first orifice 705 extends through inlet connector 313 and first sealing flange 307, though such a configuration is not required.

Figure 8:
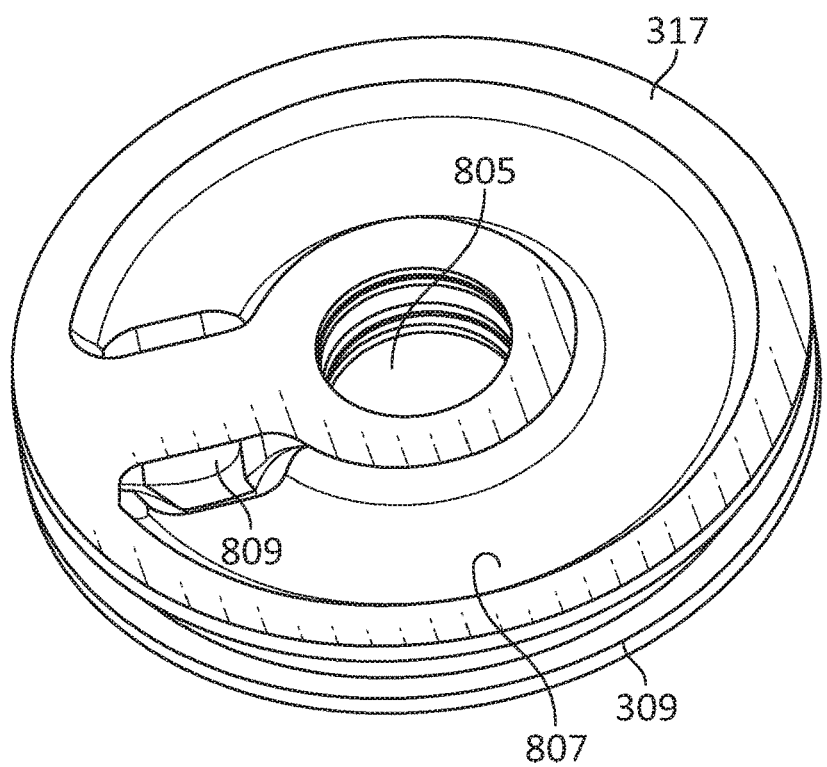
FIG. 8 is a perspective view of one example of an outlet connector consistent with the present disclosure.

The helical membrane module 300 also includes an outlet connector 317. In general, the outlet connector 317 is configured to receive and support an opposing end of the permeate cavity 101, and to facilitate the conveyance of a concentrate flow to a concentrate outlet. Like the first sealing flange 307 and inlet connector 313, the outlet connector 317 and the second sealing flange 309 may be integral with or separate from one another. FIG. 8 is a perspective view of one embodiment in which the outlet connector 317 is integral with the second sealing flange 309. In that embodiment the outlet connector 317 includes a second orifice 805 that is configured to receive and/or couple with an end of the permeate cavity 101. The second orifice 805 is also configured to fluidly couple the permeate cavity 101 with a permeate outlet 319. Retention of the permeate cavity 101 within the first and second orifices 705, 805 may be facilitated by optional permeate cavity connectors 323. When used, such connectors may be disposed inside or outside the housing 301, and may function to couple an end of the permeate cavity 101 to respective orifices 705, 801.

In embodiments and as shown in FIG. 8, the outlet connector 317 further includes a collection recess 807 and a concentrate opening 809. The collection recess 807 is generally configured to receive a concentrate flow from the helical membrane assembly 100, and to convey that concentrate flow to the concentrate opening 809. A concentrate outlet (e.g., a pipe) may be fluidly coupled to the concentrate opening 809 for the removal of the concentrate flow from the helical membrane module 300.

In operation a feed flow may be introduced into the feed pipe 311. The feed flow may be conveyed by feed pipe 311 to inlet connector 313 and feed flow transition 315. The feed flow may be introduced by the feed flow transition 315 between adjacent flights 105 of separation assembly 100. In embodiments, the feed flow transition introduces the feed flow between the upper most or lower most adjacent flights 105. The feed flow may be supplied under sufficient pressure such that it flows in a spiral fashion between adjacent flights 105 of the helical membrane leaf 103. Depending on its point of introduction, the flow of feed through the helical membrane assembly 100 may be in a first (e.g., downwards) direction, a second (e.g., upwards) direction, or a combination thereof. In the embodiment of FIG. 3, a feed flow is introduced between upper most adjacent flights 105. The feed then proceeds to flow in a downward spiral between adjacent flights 105, as shown by directional flow arrows in FIG. 3.

As the feed flows around the helical membrane assembly 100, at least a portion of it may permeate into the helical membrane leaf 103. For example, when the helical membrane leaf 103 includes a permeate carrier sandwiched between first and second membrane sheets, at least a portion of the feed (i.e., permeate) may pass through the first and/or second membrane layers and into the permeate carrier as the feed flows spirally along the helical membrane leaf 103. Permeate may be conveyed by the permeate carrier to the permeate cavity 101 within permeate cavity 101, and ultimately conveyed to permeate outlet 319.

The portion of the feed that does not permeate through the upper and/or lower membrane sheets (i.e., the concentrate) may be conveyed to outlet connector 317 and ultimately to concentrate outlet 321. For example, the concentrate may be received in collection recess 807, after which it may flow to concentrate opening 809 and ultimately to concentrate outlet 321. The concentrate may then be recycled through helical membrane assembly 100, redirected to another helical membrane assembly (e.g., of another helical membrane module), and/or collected as a waste stream or a product depending on the process.

The helical membrane assemblies described herein can present a path length for the flow of feed of any desired length. In embodiments, the helical membrane leaf 103 is configured to provide a path length that is longer other modules (e.g., tubular modules, spiral wound modules, hollow fiber modules) of comparable physical size. For example, tubular, spiral wound, and hollow fiber modules may have a path length of about 1 meter. In contrast, a similarly sized separation module consistent with the present disclosure may include a helical membrane leaf that has a path length greater than or equal to about 3, about 6, about 9, about 12, about 15, about 30, about 60, about 100, or even about 300 meters.

Due to their relatively long flow path, the separation modules described herein can provide a greater opportunity for the collection of permeate from a feed flow in a single pass through the module. While that can be useful, the relatively long path length can also present certain operational challenges, particularly if the helical membrane assembly has a narrow membrane pitch. Indeed, as the pitch decreases and path length increases, the pressure drop across the helical membrane modules described herein may increase to undesirable levels, and/or may entail the need to utilize high feed flows so that cross flow velocities at the permeate and concentrate outlets are above a minimum level. Consequently, it may be desirable to introduce a feed flow into feed pipe 311 at a high inlet flow velocity. If the inlet flow velocity is too high and the feed flow is introduced directly into the separation assembly, the energy of the feed flow may damage the helical membrane assembly 100.

To address that issue the helical membrane modules of the present disclosure may include a feed flow transition 315. As noted above the feed flow transition 315 is generally configured to receive an inlet feed flow from the feed pipe 311, and to convey that inlet feed flow to a helical membrane assembly consistent with the present disclosure. The feed flow transition is also configured to withstand the energy of the feed flow (even at high inlet feed velocities) and to change the direction of the feed flow before it is introduced between adjacent flights 105 of the helical membrane leaf 103. In that way, the feed flow transition can mitigate, limit, or even prevent damage to the helical membrane leaf 103, even when the feed is received at a relatively high inlet flow velocity.

Figure 4:
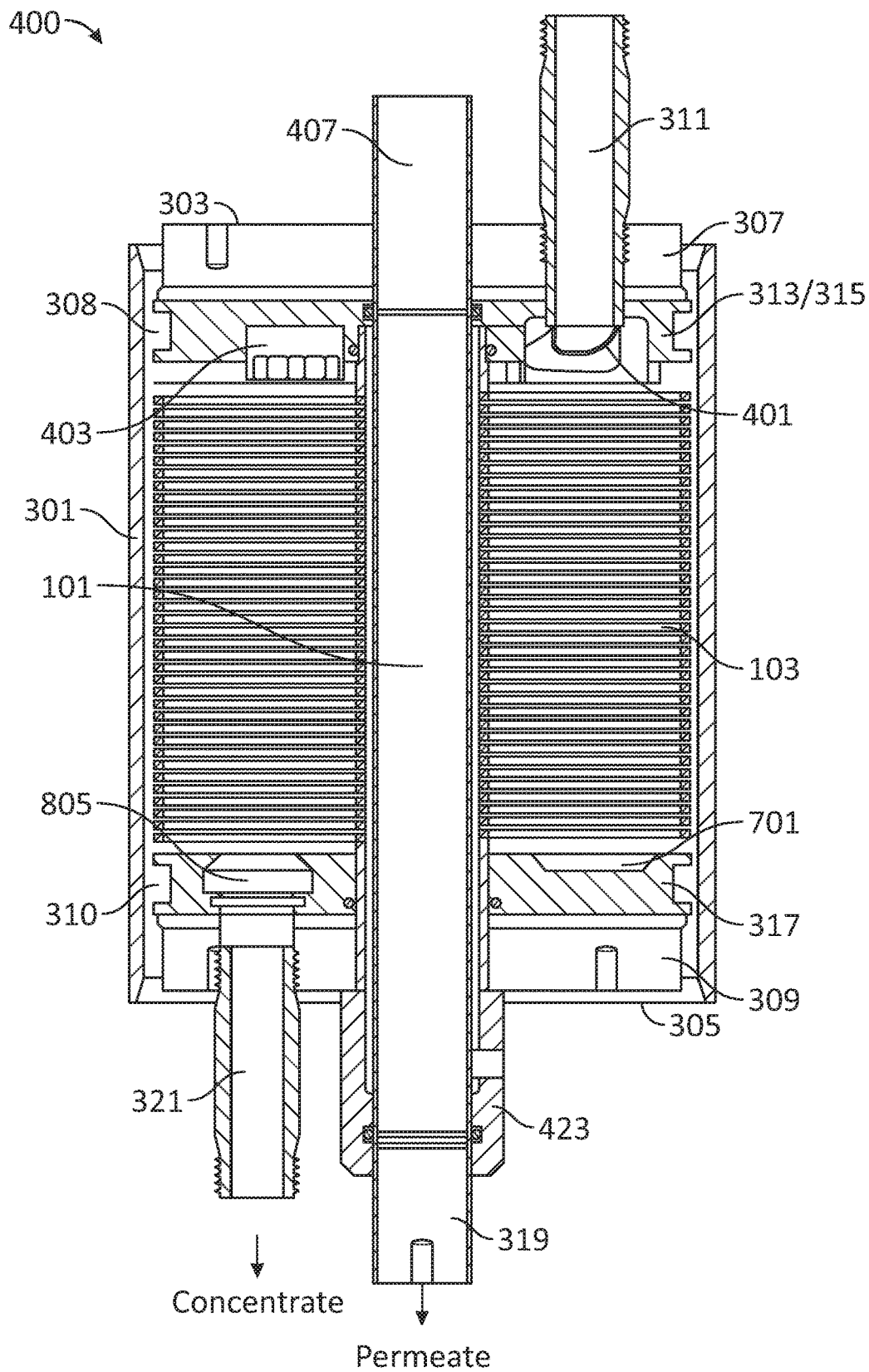
FIG. 4 is a cross sectional view of an example of a helical membrane module consistent with embodiments of the present disclosure.

Reference is now made to FIG. 4, which is a cross sectional view of another example of a helical membrane module 400 consistent with present disclosure. Helical membrane module 400 is similar to and includes many of the same components as helical membrane module 300. As the nature and function of such elements is the same as described above in connection with FIG. 3, such elements are not described again. It is noted that separation module 400 differs from separation module 300 in that: it utilizes first and second sealing flanges 307, 309 that are separate from inlet connector 313 and outlet connector 317; it includes an optional support member 407 (e.g., a tie rod); and it utilizes a permeate cavity connector 423 that is located outside of the housing 301. In addition, elements of the feed flow transition 315 that were hidden in FIG. 3 are shown in FIG. 4. Specifically, FIG. 4 shows feed flow transition 315 as including an inlet receiver 401 and a flow director 403, further details of which are shown in FIGS. 5 and 6.

Figure 5:
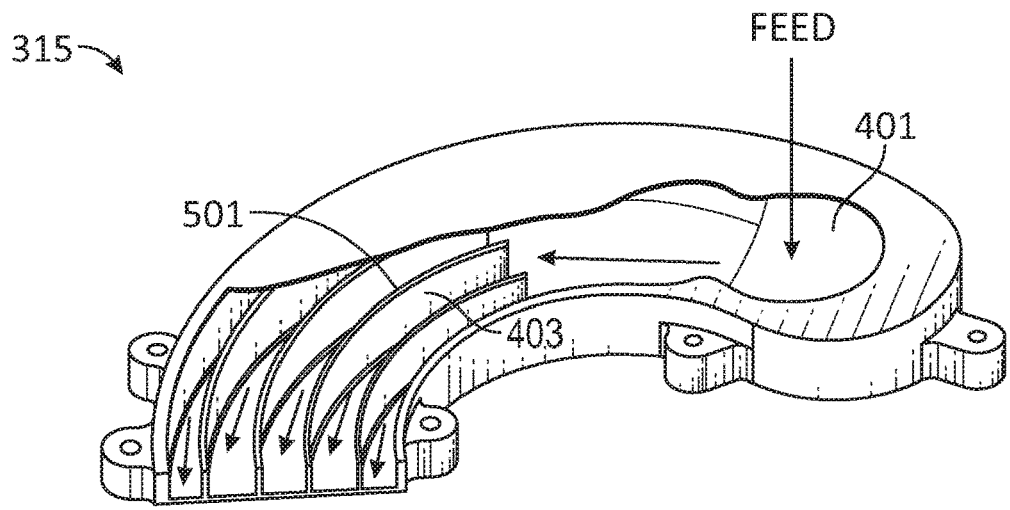
FIG. 5 is a perspective view of one example of a feed flow transition consistent with embodiments of the present disclosure.
Figure 6:
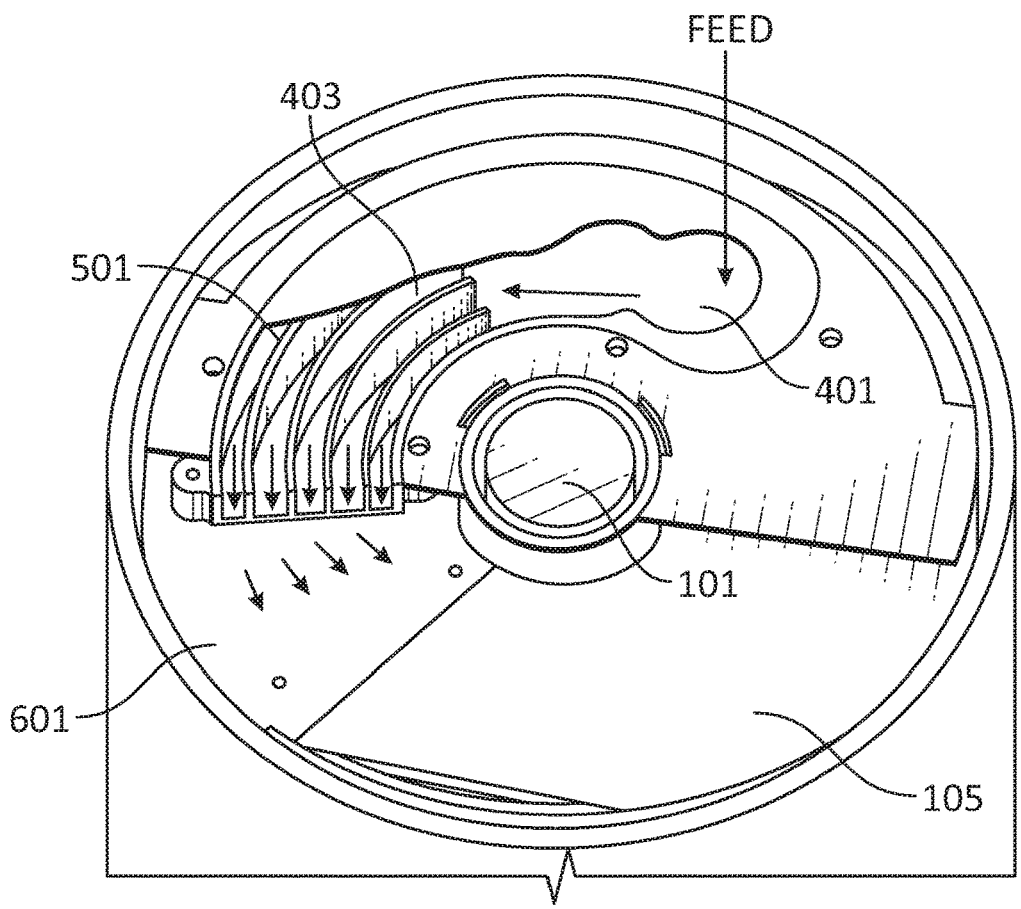
FIG. 6 is a cross-sectional view of one example of a helical membrane module including a feed flow transition consistent with embodiments of the present disclosure.

In embodiments and as best shown in FIGS. 5 and 6, the inlet receiver 401 of feed flow transition 315 may be in the form of a recess formed in a surface of a plate. In the embodiment of FIG. 5, the inlet receiver 401 is in the form of a recess having a semicircular cross section, but the shape of the inlet receiver is not limited thereto. In general, the inlet receiver 401 is configured to receive a flow of a feed at an inlet flow velocity from feed pipe 311, and to redirect the feed flow towards flow director 403. In embodiments, the inlet receiver 401 is configured to alter the direction of the inlet feed flow by greater than or equal to about 75 degrees, such as greater than or equal to 90 degrees, or more. In the embodiment of FIGS. 5 and 6, inlet receiver 401 is configured to change the direction of the inlet feed flow by about 90 degrees.

The flow director 403 is generally configured to receive the feed flow from inlet receiver 401, and to adapt the direction of the fluid flow to the configuration of the helical membrane assembly 100. In embodiments and as shown in FIGS. 5 and 6, the flow director 403 may include one or more turning vanes 501 (or other directional elements) that function to alter the direction of the feed flow received from inlet receiver 401, such that the feed flow exits the feed flow transition 315 and is introduced into the helical membrane assembly 100 at an angle that is parallel or substantially parallel (within +/−5 degrees) to the angle between adjacent flights 105 of helical membrane leaf 103.

In embodiments and as shown in FIG. 6, an optional flow transition plate 601 may be used in conjunction with the feed flow transition 315. When used, the optional flow transition plate 601 may extend from under an end of the flow director 501 to between two adjacent flights 105 of helical membrane leaf 103. In operation a feed flow exiting flow director 403 may be directed onto the surface of the flow transition plate 601, after which it may flow along the surface of the flow transition plate 601 and into a space between adjacent flights 105 of the helical membrane leaf 103. Once the feed flow is introduced between the adjacent flights 105 (with or without a flow transition plate 601), separation of the feed into permeate and concentrate may proceed in the same manner as described above in connection with FIG. 3.

The feed flow transition 315 and/or the elements thereof may be made of any suitable materials, such as but not limited to thermoplastic polymers, thermoset polymers, metals, alloys, combinations thereof, or the like. In embodiments the feed flow transition 315 is formed from one or more metals or alloys, such as but not limited to aluminum, steel (e.g., carbon steel, stainless steel), bronze, brass, or the like. In such embodiments feed flow transition 315 may be formed by any suitable method of forming metallic structures, such as casting, forging, molding, billet machining (e.g., via computer numerical control (CNC)), combinations thereof, and the like. In other embodiments the feed flow transition 315 is formed from one or more thermoplastic or thermoset materials. In such embodiments the feed flow transition 315 may be formed by any suitable technique for forming thermoplastic or thermoset articles, such as additive manufacturing, molding, thermoforming, billet machining, combinations thereof, and the like. Without limitation, in embodiments the flow transition is formed by additive manufacturing using one or more thermoplastic or thermosetting polymer materials.

As noted above the helical membrane assemblies (and the modules into which they are installed) described herein may be configured to facilitate and/or induce the formation of secondary flows within a feed flow and, in some cases a permeate flow. In particular, the helical membrane modules may be configured to facilitate the development of Dean vortices, which can enhance mass transport across the surface(s) of the helical membrane leaf.

It is believed that Dean vortices form in the helical membrane assembly described herein from the modification of the flow profile of a fluid stream in the "duct" between the flights of the helical membrane leaf due to centrifugal force pushing the high velocity fluid stream towards the outside of the duct. The effect of the centrifugal force operating perpendicular to the flow direction relative to the inertial force of the fluid in the flow direction is represented by the dimensionless number known as the Dean number, $D_e$, which may be represented mathematically by formula (I) below:

$$D_e = R_e \left[\frac{d_i}{d_c}\right]^{0.5} \quad (I)$$

where $R_e$ is the Reynolds number, $d_i$ is the diameter of the duct (hydraulic diameter of duct defined by inner edge or inner spacer element, outer edge or outer spacer element and upper and lower faces of helical membrane leaf), and $d_c$ is the coil diameter from the center line of the duct cross section to the center axis of the helical membrane leaf, modified to consider the pitch of the flights of the helical membrane leaf. The Reynolds number $R_e$ is given by $$R_e = \frac{V d_h}{\mu},$$

where V is the fluid velocity, $d_h$ is the hydraulic diameter, and μ is the kinematic viscosity. In embodiments where the pitch of the helical membrane is small, the effect of that pitch on the effective coil diameter is negligible and may be ignored. The following discussion assumes a negligible effect of membrane pitch, and therefore the effect of pitch is not accounted for below.

Dean vortices occur when in the laminar flow regime. The critical Reynolds number $R_{ec}$ at which a flow leaves the laminar flow regime is given by formula (II) below:

$$R_{ec} = 2 \times 10^4 \left[\frac{d_i}{d_c}\right]^{0.32} \quad (II)$$

As the curvature of the helical membrane leaf increases (diameter of the helical membrane leaf gets smaller relative to the duct hydraulic diameter), the laminar flow regime may be stabilized so that the transition to turbulent flow may be pushed to higher Reynolds numbers.

As noted above the helical separation membranes described herein may be configured to operate within the laminar flow regime and to support the formation of Dean vortices within the feed and/or permeate flows therein. To accomplish that goal the helical separation membranes described herein may be configured to exhibit a first Reynolds (Re1) number proximate their inlet and a second Reynolds (Re2) number proximate their outlet, wherein Re1 and Re2 may be the same or different. In embodiments, Re1 is greater than Re2, and in other embodiments Re2 is greater than Re1. Without limitation, in some embodiments the helical separation modules have an Re1 proximate their inlet and an Re2 proximate their outlet, where Re1 is greater than Re2.

The precise values of Re1 and Re2 may vary, so long as they are below the critical Reynolds number at their respective locations, such that laminar flow of the fluid within the helical separation membrane is maintained. In that regard, the helical separation membranes described herein may be have a first critical Reynolds number (Rec1) proximate their inlet and a second critical Reynolds number (Rec2) proximate their outlet, wherein Rec1 and Rec2 are the same or different. In embodiments Rec is greater than Rec2. In such embodiments, Re1 is less than Recd, and Re2 is less than Rec2, so as to maintain laminar flow. For example, in one embodiment a helical membrane assembly 100 may be configured to exhibit a Re1 (inlet) and Rec1 (inlet) of about 9500 and 10500, respectively, and a Re2 (outlet) and Rec2 (outlet) of about 2600 and 5990, respectively. In such embodiment, the helical membrane assembly may be understood to operate in a high laminar flow regime for most of its flow path. This may have significant implications for the energy efficiency of the helical separation membrane, as the pressure drop across the helical separation membrane is proportional the fluid velocity to the 1.33 power in laminar flow with Dean vortices. This contrasts with the transitional and turbulent flow regimes, where pressure drop is proportional to the fluid velocity to the 1.6 or 1.8 power in a helical coil.

In embodiments the helical membrane modules are configured to operate in Dean flow. In such instances the helical separation membranes described herein may be designed to exhibit a first Dean number (De1) proximate their inlet and a second Dean number (De2) proximate their outlet, wherein De1 and De2 may be the same or different. In embodiments, De1 is greater than De2, or vice versa. In non-limiting preferred embodiments De1 is greater than De2. The precise value of De1 and De2 may vary, and may be selected to attain desired operational parameters. For example, in embodiments De1 and De2 range from greater than 0 to about 5000 or more, such as from greater than 0 to about 4500, from about 100 to about 4500, or even from about 250 to about 4000. In some embodiments, De1 ranges from about 2500 to about 4500, and De2 ranges from greater than 0 to about 500. For example, in some instances De1 is in the range of about 4000 to about 4500, and De2 is in the range of about 200 to about 500. Such values are supportive of the formation of Dean vortices within the fluid flow, which as noted above can increase permeate flux and energy efficiency.

It is noted that the helical membranes leaves (and helical membrane assemblies/modules) need not be operated in Dean flow. For example, helical membrane modules including a helical membrane leaf described herein may be driven with high cross flow velocity (more energy) to drive the permeate flux higher, but at higher energy cost. For example, the inlet end of the helical membrane module could be driven at the turbulent flow regime with relatively high pressure drop (as compared to operation in the laminar flow regime). Dean flow could be established near the outlet end of the helical membrane module, thereby achieving a balance between higher permeate flux and energy efficiency.

The modules described herein can be used in various methods for processing a feed. Such methods may enhance permeate productivity and feed concentration in concert with crossflow and secondary flow enhancements. In embodiments the methods include permeate backpulse, permeate backflush, chemically enhanced backwash and uniform transmembrane pressure processes.

Permeate backpulse is a process in which permeate is driven under pressure from the permeate side of a membrane to a feed side of the membrane to dislodge debris from the membrane surface and disturb a retentate polarization layer that forms on surfaces of the membrane during permeation. Permeate backpulsing may be performed intermittently during the processing of a feed stream, e.g., once every few seconds to once every few hours at pressures of one time to five times that of the feed pressure. The duration of each backpulse may vary and may range from about one second to about 5 seconds. The feed may or may not be pressurized and may or may not be flowing through the module during a backpulse For the sake of illustration, a permeate backpulse process will now be described with reference to the helical membrane module of FIG. 3. In a permeation mode, feed may enter helical membrane module 100 through feed inlet 311, flow between flights 105 of helical membrane leaf 103 and around permeate cavity 101. During the process permeate is transported across the membrane sheet and into the permeate carrier in the helical membrane leaf 103. Permeate is then transported through the permeate carrier to the permeate cavity 101 and then out permeate outlet 319. The feed, which is flowing through helical membrane assembly 100, becomes more concentrated in material retained by the membrane until it flows out outlet 321 as concentrate or retentate.

At a predetermined time, pressure differential, or some other determined set of conditions, a permeate backpulse operation may be performed. The permeate backpulse operation may include stopping the permeate flow quickly reversing the permeate flow back with a driving force through the permeate cavity, the permeate carrier, and into the back side of the membrane sheet until the permeate surges from the permeate side of the membrane to the feed side. The reversed flow of permeate pressurizes and debris on the membrane surface and drives it into the feed. Because the reversed permeate flow is away from the membrane separation surface, a polarization layer in the membrane may be affected (e.g., destroyed or otherwise damaged) until permeation into the feed side membrane surface is re-established. Backpulsing can be effectively used with the helical membrane module 300 because of the relatively short flow path through the permeate carrier across the width of the flight from the inner edge to the outer edge, relative to the permeate flow path lengths in spiral wound modules and many plate and frame modules.

Permeate backflush is another process that can be used with the modules described herein, and is like permeate backpulse in various ways. One difference between permeate backflush and permeate backpulse is that the driving force applied in a backflush operation is generally less than the driving force applied in a backpulsing operation. Consequently, backflush operations are often executed for longer periods of time (relative to backpulse operations) and may rely on debris being removed from the membrane surface due to entrainment in the reverse flow of permeate (e.g., flushing). This contrasts with the quickly applied mechanical force used by backpulsing to dislodge debris from the membrane surface. Backflushing may therefore be suitable for use with membrane types that are less mechanically robust (e.g., polymeric hollow fiber modules) as compared to membrane types that are mechanically strong (e.g., ceramic multichannel modules).

Chemically enhanced backwash is another process that can be used with the modules described herein. Chemically enhanced backwashing is mechanically the same as permeate backflushing except that one or more chemicals are included in the permeate or, if necessary, an alternative fluid. The alternative fluid may be used, for example, when there is a chemical incompatibility between permeate composition and the chemicals that are to be used in the backwashing process. For example, some chemicals may cause solids to precipitate from the permeate, which could clog the permeate side of the membrane. In such instance, an alternative fluid could be used to avoid such precipitation. In any case, one purpose of the chemicals is to dissolve the debris on the membrane surface or at least dissolve materials that are adhering debris to the membrane surface, allowing the debris to be washed off the membrane surface or even out of the depth of the membrane pore structure depending on the membrane type and process being performed.

A uniform transmembrane pressure process is another process that can be used with the modules of the present disclosure. Uniform transmembrane pressure processes utilize a fluid flow on the permeate side of the membrane and which flows in the same direction as the feed, i.e., concurrent flow. The fluid flow on the permeate side of the membrane is manipulated so that the pressure drop from the module inlet to the outlet matches the pressure drop due to the feed flow on the feed side of the membrane. When this occurs, the difference between feed pressure and permeate pressure (i.e., transmembrane pressure) which drives permeate through the membrane is the same (i.e., uniform) along the entire flow path of the membrane. The uniform transmembrane pressure can provide benefits to the membrane separation process. For example, a conventional crossflow membrane module process will have a relatively high membrane module feed inlet pressure and a relatively low membrane module concentrate outlet pressure. As the permeate flow is typically a fraction (e.g. 1 to 5%) of the feed flow through the membrane module, the pressure drop to move permeate through and out of the module is much lower than the feed so the comparative pressure drop through the module is much smaller on the permeate side than on the feed side of the membrane. Hence, the transmembrane pressure is typically higher on the inlet end than on the outlet end resulting in a higher permeate flux through the membrane on the inlet than on the outlet. Due to disparity of permeate flow through the membrane from inlet to outlet, the amount of fouling of the membrane too is disparate with most of the permeate flow and fouling on the inlet end at the start of the process. Over time, the section of the module from which most of the permeate flow is generated may gradually move down the length of the module as the membrane fouling zone extends from the inlet toward the outlet, until the whole membrane area is fouled. This process can cause rapid fouling of the muddle, resulting in relatively short time periods between chemical cleanings. This in turn results in more cleanings over a defined time and potentially shortened membrane service life. Thus, for desired performance, it is often better to have as uniform a transmembrane pressure as possible.

A uniform transmembrane pressure process may also facilitate the operation of the helical membrane modules described herein. Because of their (potentially very long) flow path, the pressure drop between the module inlet and outlet of a helical membrane module can be high. If that pressure drop is significant (as compared to the transmembrane pressure needed for the process), the module may non-uniformly foul along the membrane length—potentially causing reduced performance. When a uniform transmembrane pressure is used, the entire helical membrane module can be used efficiently, avoiding that issue.

In some embodiments a uniform transmembrane pressure process can be implemented by extending permeate cavity 101 so that permeate can enter on the feed inlet 311 and exit from permeate outlet 319 of the module—allowing the generation of flow along the permeate cavity using an external driving force such as a pump. Given the relatively open permeate cavity 101 and short flow path relative to the feed flow path, the flow rate of permeate through the permeate cavity 101 that is needed to match the pressure drop on the feed side may be impractically high. Hence, an inert media such as plastic, ceramic, glass, or metal grains, particles, spheres, or any media that has the requisite chemical durability, process compatibility and flow—pressure drop characteristics such that a reasonable flow rate through the permeate cavity can be used to match the pressure drop on the feed side of the membrane. Permeate can be pumped through permeate cavity 101 when filled with the appropriate media and then have it exit from the permeate outlet. As the permeate flow path along the permeate carrier is relatively short and the pressure drop very small, the pressure on the permeate side of the membrane sheets within each flight 105 along the length of the module is lower than the previous flight so the actual transmembrane pressure within each flight 105 of the helical membrane leaf 103 is essentially the same.

As permeate will be generated within helical membrane module 300, there will be permeate flow which will add to the externally driven permeate flow. The pressure drop associated with this internally generated permeate flow will be the smallest at the helical membrane module inlet and the greatest at the helical membrane module outlet. As a non-limiting optimization, the externally generated permeate flow should be large enough so that the pressure drop due to internally generated permeate flow does not significantly affect the uniformity of the transmembrane pressure along the length of the helical membrane module. Further, this internally generated permeate will need to be bled from the permeate recirculation loop around the helical membrane module(s).

It should also be noted that backpulse, backflush, and chemically enhanced backwash processes can be combined with a uniform transmembrane process by adjusting the pressure and chemistry of the fluid in the external permeate recirculation loop.

As used herein the term "about" when used in connection with a numerical value or range means +/−5% of the indicated value or range.

While the principles of the present disclosure have been described herein, it is to be understood by those skilled in the art that this description is made only by way of example and not as a limitation as to the scope of the claimed invention. The features and aspects described with reference to particular embodiments disclosed herein are susceptible to combination and/or application with various other embodiments described herein. Such combinations and/or applications of such described features and aspects to such other embodiments are contemplated herein. Modifications and other embodiments are contemplated herein and are within the scope of the present disclosure.

What is claimed is:

1. A membrane module, comprising:
a housing comprising first and second ends;
a helical membrane assembly disposed with the housing, the helical membrane assembly comprising a permeate cavity and a helical membrane helically wound around and fluidly coupled to the permeate cavity, wherein the helical membrane rotates around and along a longitudinal axis of the permeate cavity such that a first end of the helical membrane assembly is disposed proximate the first end of the housing, and a second end of the helical membrane assembly is disposed proximate the second end of the housing;

an inlet connector in the housing and coupled to the first end of the helical membrane assembly;

an outlet in the housing and coupled to the second end of the helical membrane assembly; and a permeate outlet coupled to the permeate cavity.

2. The membrane separation module of claim 1, wherein: the helical membrane comprises a plurality of membrane sheets.

3. The membrane separation module of claim 2, wherein: the helical membrane has an inner edge and an outer edge; the permeate cavity comprises an outer wall defining a permeate cavity opening; and
the inner edge of said helical membrane is disposed within the permeate cavity opening.

4. The membrane separation module of claim 1, wherein: the helical membrane has an inner edge and an outer edge; the helical membrane assembly further comprises a plurality of spacer elements;
the helical membrane further comprises a plurality of flights; and
at least one of said plurality of spacer elements is located between two adjacent flights of said plurality of flights.

5. The membrane separation module of claim 4, wherein: each of said plurality of flights comprises at least a first spacer element and a second spacer element, wherein the first spacer is disposed radially inward of the second spacer element.

6. The membrane separation module of claim 1, wherein: the helical membrane comprises a permeate carrier disposed between a first membrane layer and a second membrane layer.

7. The membrane separation module of claim 1, wherein the helical membrane comprises a plurality of flights helically wound around the permeate cavity, and when a feed flow flows helically around said permeate cavity, said feed flow includes dean vortices.

8. The membrane separation module of claim 1, wherein:
the helical membrane comprises a plurality of flights helically wound around the permeate cavity;
said feed inlet comprises a feed pipe and a flow transition, the flow transition comprising an inlet receiver and a flow director;
the feed pipe comprises a first end to receive an inlet feed flow and a second end in fluid communication with the inlet receiver;
the inlet receiver is fluidly coupled to said feed pipe and directs said inlet feed flow to said flow director; and
said flow transition is fluidly coupled to receive said inlet receiver and is fluidly coupled to a helical space between two adjacent flights said plurality of flights.

9. The membrane separation module of claim 8, wherein:
said two adjacent flights of said plurality of flights have a membrane pitch; and
said flow director is fluidly coupled to said helical space in a direction that is parallel or substantially parallel to the membrane pitch.

10. The membrane separation module of claim 8, wherein:
said flow director comprises a first end and a second end, the first end in fluid communication with the inlet receiver and the second end disposed proximate said helical space; and
the first end of the flow director is on a different plane than the second end of the flow director.

11. The membrane separation module of claim 8, wherein the inlet receiver is to convey a feed flow to said flow director in a first direction, and the flow director is configured to deliver the feed flow to said helical space in a second direction that is different from the first direction.

* * * * *